(12) United States Patent
Townsend

(10) Patent No.: US 6,276,204 B1
(45) Date of Patent: Aug. 21, 2001

(54) DIGITAL CONTROL SYSTEM FOR A VIBRATING STRUCTURE GYROSCOPE

(75) Inventor: Kevin Townsend, Plymouth (GB)

(73) Assignee: BAE Systems plc, Farnborough (GB)

( * ) Notice: Subject to any disclaimer, the term of this patent is extended or adjusted under 35 U.S.C. 154(b) by 0 days.

(21) Appl. No.: 09/396,443

(22) Filed: Sep. 15, 1999

Related U.S. Application Data

(63) Continuation of application No. PCT/GB98/02819, filed on Sep. 17, 1998.

(30) Foreign Application Priority Data

Sep. 18, 1997 (GB) .................................................. 9719767

(51) Int. Cl.[7] .................................................... G01P 9/04
(52) U.S. Cl. ........................................ 73/504.12; 73/1.37
(58) Field of Search .......................... 73/504.02, 504.03, 73/504.04, 504.12, 504.13, 504.14, 504.15, 504.16, 1.37; 702/145, 147

(56) References Cited

U.S. PATENT DOCUMENTS

| | | |
|---|---|---|
| 5,197,331 * | 3/1993 | Oikawa ............................. 73/504.12 |
| 5,444,639 | 8/1995 | White ................................ 73/504.16 |
| 5,459,432 | 10/1995 | White et al. ........................... 329/307 |
| 5,531,115 | 7/1996 | Erdley ................................ 73/504.02 |
| 5,712,427 * | 1/1998 | Matthews ........................... 73/504.04 |
| 5,736,640 * | 4/1998 | Farine et al. ....................... 73/504.12 |
| 5,983,719 * | 11/1999 | Matthews et al. ................. 73/504.13 |

* cited by examiner

*Primary Examiner*—Helen Kwok
(74) *Attorney, Agent, or Firm*—Nixon & Vanderhye P.C.

(57) ABSTRACT

A digital control system for a vibrating structure gyroscope having a vibrating structure (3), at least a primary drive (4) for putting and maintaining the vibrating structure (3) in vibratory resonance, and at least a primary pickoff (2) for detecting vibration of the vibrating structure (3), includes a digital processing unit (22) for receiving output signals from the pickoff (2) for processing the received signals and for passing them to the primary drive (4) via digital to analogue converters (20). The system includes sampling at selected intervals of time the output signals before passage to the digital processing unit (22) and a variable frequency oscillator (23) connected to and under the control of the digital processing unit (22) for controlling the sampling intervals.

10 Claims, 8 Drawing Sheets

DIGITAL CONTROL SYSTEM FOR A VIBRATING STRUCTURE GYROSCOPE

This is a continuation of PCT application No. PCT/GB98/02819, filed Sep. 17, 1998, the entire content of which is hereby incorporated by reference in this application.

BACKGROUND OF THE INVENTION

1. Field of the Invention

This invention relates to a digital control system for a vibrating structure gyroscope of the kind having a vibrating structure, primary and secondary drive means for putting and maintaining the vibrating structure in vibratory resonance and primary and secondary pick-off means for detecting vibration of the vibrating structure.

2. Discussion of Prior Art

Known vibrating structure gyroscopes have been constructed using a variety of different mechanical vibratory structures. These include beams, tuning forks, cylinders, hemispherical shells and rings. A common feature in all these known systems is that they are required to maintain a resonance carrier mode oscillation at a natural frequency determined by the mechanical vibratory structure. This provides the linear momentum which produces Coriolis force when the gyro is rotated around the appropriate axis. Various systems conventionally are used to measure the Coriolis force depending on the actual structure of the gyroscope.

A typical conventional analogue closed loop control system for a shell like vibrating structure 3 is shown in FIG. 1 of the accompanying drawings. This system consists of two ideally independent loops, namely a primary or excitation loop 1 between a primary pick-off means 2 which acts as a motion detector output from the vibrating structure 3, and a primary drive means 4 which acts as a forcing input creating vibration in the structure 3. A secondary or damping loop 5 is provided between secondary pick off means 6 and a secondary drive means 7. The primary loop 1 is required to excite the vibrating structure 3 at its natural resonant frequency which is defined as a 90 degree phase between the primary pick off means 2 and the primary drive means 4, and to control the amplitude of the resultant signal at the primary pick off means 2 which in effect is the amplitude of the resultant vibration. Typically the phase detector 8 is used to determine the 90 degree phase relationship and an amplitude detector 9 with a reference level 10 is used to set the required primary pick off means amplitude. The secondary loop 5 is shown in a typical force feedback configuration to provide damping for the high Q rate response in order to achieve the required system performance.

The closed loop system of FIG. 1 is conventionally an analogue system and relies for much of its performance on the ability accurately to track the resonant frequency of the high Q mechanical vibrating structure and to discriminate, by the relative phasing, between wanted and unwanted or error signals.

Practical sensors operate at frequencies in the range 5 kHz to 20 kHz with Q factors in the range 2000 to 20000. This puts severe constraints on the phase accuracies of the electronic control systems used to implement these gyroscopes. In these systems a phase error of 0.5 degrees can lead to large bias errors and consequently failure to meet the required specification.

Traditionally the control loops for these sensors are implemented using precision analogue electronic circuits which are notoriously difficult to specify, design and integrate into small low cost systems (i.e. ASICS). It is also difficult to apply calibrations and compensations to systems based on analogue circuits. In addition, modern systems require the sensor outputs to be available in digital format to simplify system integration and enable further compensations to be applied to enhance performance.

In the FIG. 1 arrangement the primary loop 1 also includes a filter 11, a voltage controlled oscillator (VCO) 12, a gain control 13 and an amplifier 14. The secondary loop 5 includes an amplifier 18, a filter 15, and a demodulator 16 from which issues a direct current output signal 17 proportional to the applied angular rate.

There is thus a need for a digital electronic based implementation of the loops 1 and 5 in order to facilitate ASIC development, system integration and provide a route to higher performance by enabling more complex and "in loop" compensations to be applied. Unfortunately on a signal at 20 kHz a 0.5 degree phase resolution is equivalent to a sampling delay of 70 nanoseconds. This puts very high demands on any conventional precision digitisation and processing system required to resolve to the desired accuracy.

A conventional sampled data system is shown in FIG. 2 which utilises digital processing. The conventional system of FIG. 2 utilises analogue to digital converters 19 for sampling and converting output signals respectively from the primary pick off means 2 and secondary pick off means 6. Additionally provided are digital to analogue converters 20 with the converters 19 and 20 being synchronised to a fixed frequency crystal oscillator 21. The oscillator 21 operates a very high frequency (14 MHz) and the vibrating structure 3 of the gyroscope operates at a much lower frequency (20 kHz). The outputs from the primary pick of f means 2 and secondary means 6 are digitised by the digital converter 19 at a very high frequency and are fed to input 22a of a digital processing unit 22 to produce a quantised representation of the analogue output waveform. This typically requires a 70 nanosecond, (14 MHz) sample/conversion rate for each channel simply to quantise to a 0.5 degree resolution. Significant additional processing would be required to resolve the phasing sufficiently to achieve performance. This would be difficult and costly to implement to the require amplitude resolution which is typically 12 bits simply to resolve 1 degree/second. In the conventional system of FIG. 2 a clock signal is provided from the oscillator 21 to the unit 22 at 22b, a data output signal at 22c and a digital rate output signal at 22d.

There is thus a need for a digital control system which does not require very high sample rates and which is therefore more suitable as a vibrating structure gyro control system.

SUMMARY OF THE INVENTION

According to one aspect of the present invention there is provided a digital control system for a vibrating structure gyroscope having a vibrating structure, primary drive means for putting and maintaining the vibrating structure in vibratory resonance and primary pick off means for detecting vibration of the vibrating structure, which system includes a digital processing unit for receiving output signals from the primary pick off means, for processing the received signals and for passing them to the primary drive means via digital to analogue converters, means for sampling at selected intervals of time said output signals before passage to the digital processing unit and a variable frequency oscillator connected to and under the control of the digital processing unit for controlling the sampling means sampling intervals.

Preferably the digital control system includes secondary drive means for putting and maintaining the vibrating structure in vibratory resonance and second pick-off means for detecting vibration of the vibrating structure.

Conveniently the digital processing unit is operable to adjust the frequency of the variable frequency oscillator to a multiple of the resonant frequency of the vibrating structure based upon the output signals received by the digital processing unit from the primary pick off means.

Advantageously the variable frequency oscillator is operable to generate a processor interrupt signal for synchronising loop filtering and control means within the digital processing unit with the output signals received from one or more analogue to digital converters connected to receive the output signals from the primary and secondary pickoff means, which one or more analogue to digital converters form part of the means for sampling at selected intervals of time said output signals before passing to the digital processing unit.

Preferably the digital control system includes two analogue to digital converters, wherein the variable frequency oscillator is arranged to operate at substantially four times the natural resonant frequency of the vibrating structure to ensure sampling of the primary and secondary pickoff output signals on each quarter cycle of the output signals to the analogue to digital converters from the primary and second pickoff means.

Conveniently the sampling means includes two or more sample and hold devices for each output signal channel from the primary and secondary pickoff means to provide interleaving of the samples.

Advantageously the digital control system includes data buffer for receiving data from the analogue to digital converter or converters after each quarter cycle and storing the data to enable the digital processing unit to receive data from the buffer over complete cycles of the primary and secondary pick off means output signal waveform.

Preferably the digital to analogue converters generate a drive waveform for passage to the primary and secondary drive means to excite the vibrating structure into vibratory resonance which digital to analogue converters are synchronised to the variable frequency oscillator output.

Preferably the means for sampling at selected intervals of time said output signals before passage to the data processing unit includes two or more sigma delta analogue to digital converters arranged to receive the output signals from the primary and secondary pickoff means to integrate the output signal waveform over the sample period.

According to a further aspect of the present invention there is provided a vibrating structure gyroscope having a digital control system according to the present invention.

BRIEF DESCRIPTION OF THE DRAWINGS

For a better understanding of the invention, and to show how the sane may be carried into effect reference will now be made, by way of example, to the accompanying drawings, in which.

DETAILED DISCUSSION OF PREFERRED EMBODIMENTS

Figure 1:
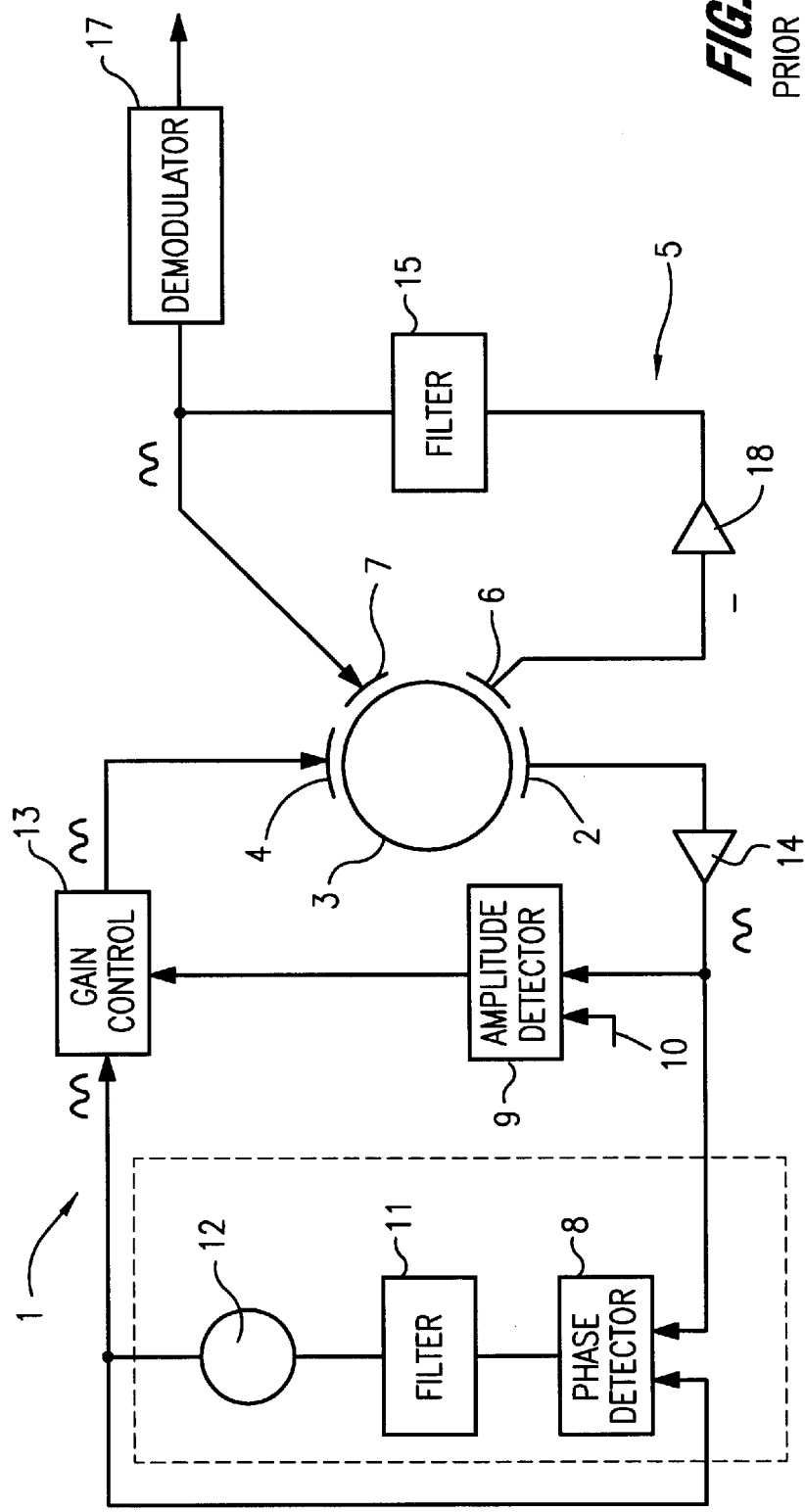
FIG. 1 is a schematic block diagram of a conventional analogue control system not according to the present invention for a vibrating structure gyroscope.
Figure 2:
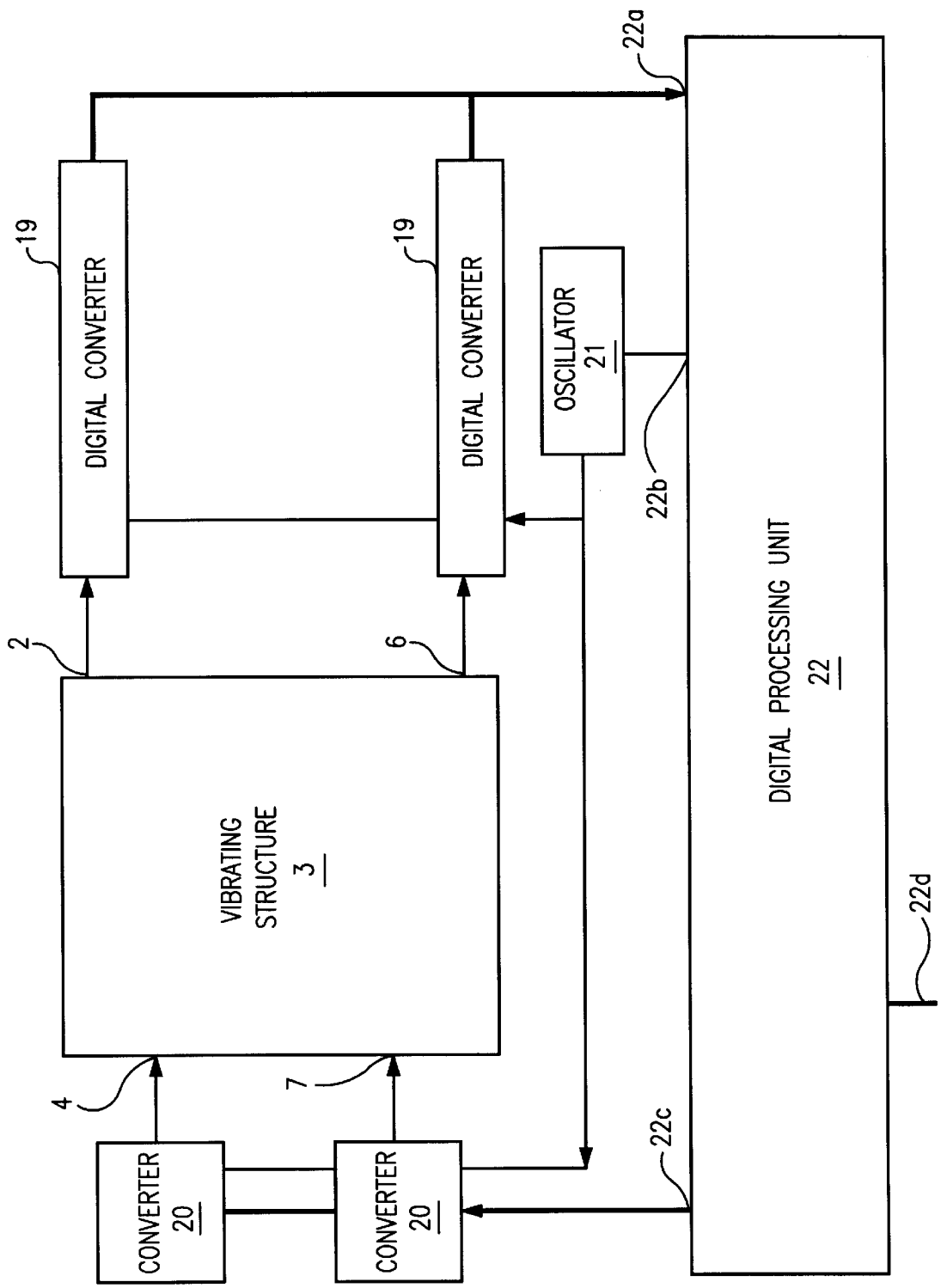
FIG. 2 is a block diagram of a conventional digital sampling system not according to the present invention for a vibrating structure gyroscope.
Figure 3:
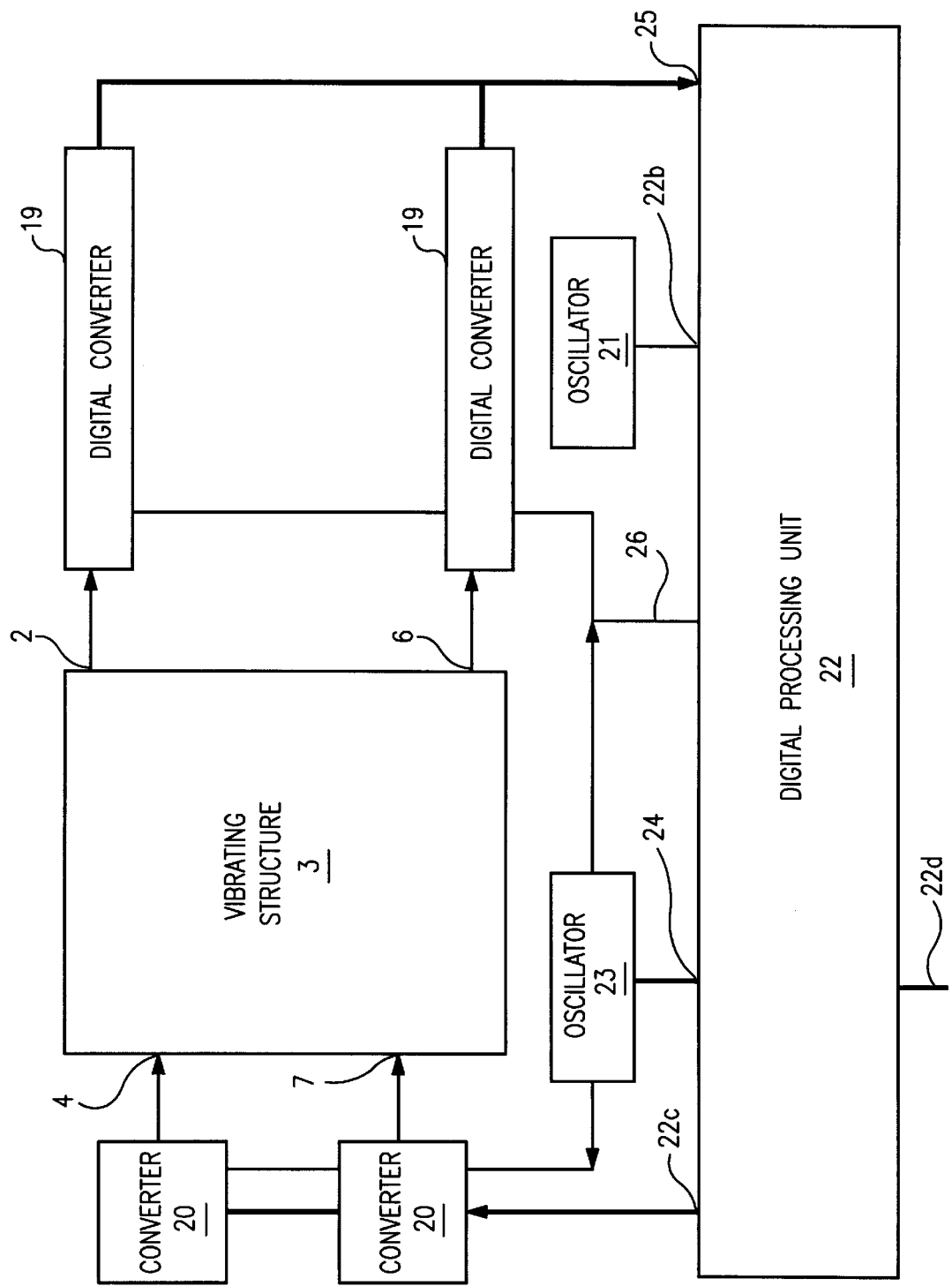
FIG. 3 is a generalised block diagram of a digital control system according to a first embodiment of the present invention.

A digital control system according to a first embodiment of the present invention is shown in block diagram form in FIG. 3 of the accompanying drawings. For convenience the system of this and other embodiments is shown as a closed loop system but it is to be understood that the invention is equally applicable to open loop systems which do not need secondary drive or pick off means. Insofar as the diagram of FIG. 3 includes items previously discussed in connection with FIG. 2 the similar items will be given the same reference numbers and not described in further detail. However in the embodiment of the present invention as shown in FIG. 3 means are provided for sampling at selected intervals of time the output signals before passage to the digital processing unit 22. This includes a variable frequency oscillator 23 connected to and under the control of the digital processing unit 22 at 24 for controlling the sample means sampling intervals.

The oscillator 23 has the ability to have its frequency adjusted by a digital control word received at 24 from the digital processing unit 22 which is operable to adjust the frequency of the oscillator 23 to match the resonant frequency of the vibrating structure 3 based upon the output signals received by the unit 22 from the primary pickoff means 2. The resonant frequency of the vibrating structure 3 will typically be 20 kHz. The digital control is used to adjust the frequency of the oscillator 23, conveniently at 80 khz to a convenient multiple of the frequency of the resonant structure to a very high degree of resolution. The control word will be determined by a loop filtering algorithm within the digital processing unit 22 based on the signals present at the primary pickoff means 2.

The signals from the primary pickoff means 2 and secondary pickoff means 6 after passage through the analogue to digital converters 19 are received at the unit 22 at input 25 at 80 khz. The timing of the sampling and conversion cycle is entirely controlled by the variable frequency oscillator 23 which is also used to generate a processor interrupt 26 at 80 khz to enable the loop filtering and control algorithms within the processor unit 22 to be synchronised to the output data from the analogue to digital converters 19.

The variable frequency oscillator 23 normally is operable at four times the vibrating structure gyro natural resonant frequency to enable sampling over each quarter cycle of the input signal. This enables the relative phase of the input signals from the primary pickoff means 2 and secondary pickoff means 6 to be computed by summing and differencing the appropriate samples. Similarly the drive waveforms to excite the vibrating structure primary drive means 4 and secondary drive means 7 are generated by the digital to analogue converters 20 which are synchronised to the output from the variable frequency oscillator 23. The amplitude for each quarter cycle is set by digital control words from the unit 22 at 22c. This enables a drive waveform of any relative phase to be applied to the vibrating structure 3. With this embodiment the sample/conversion time may be as low as 4/20 kHz equals 80 kHz. This is very much less than the 14 MHz required in a conventional system and enables simple low cost precision analogue to digital converters to be used which can more readily be integrated into a monolithic integrated circuit.

Figure 4:
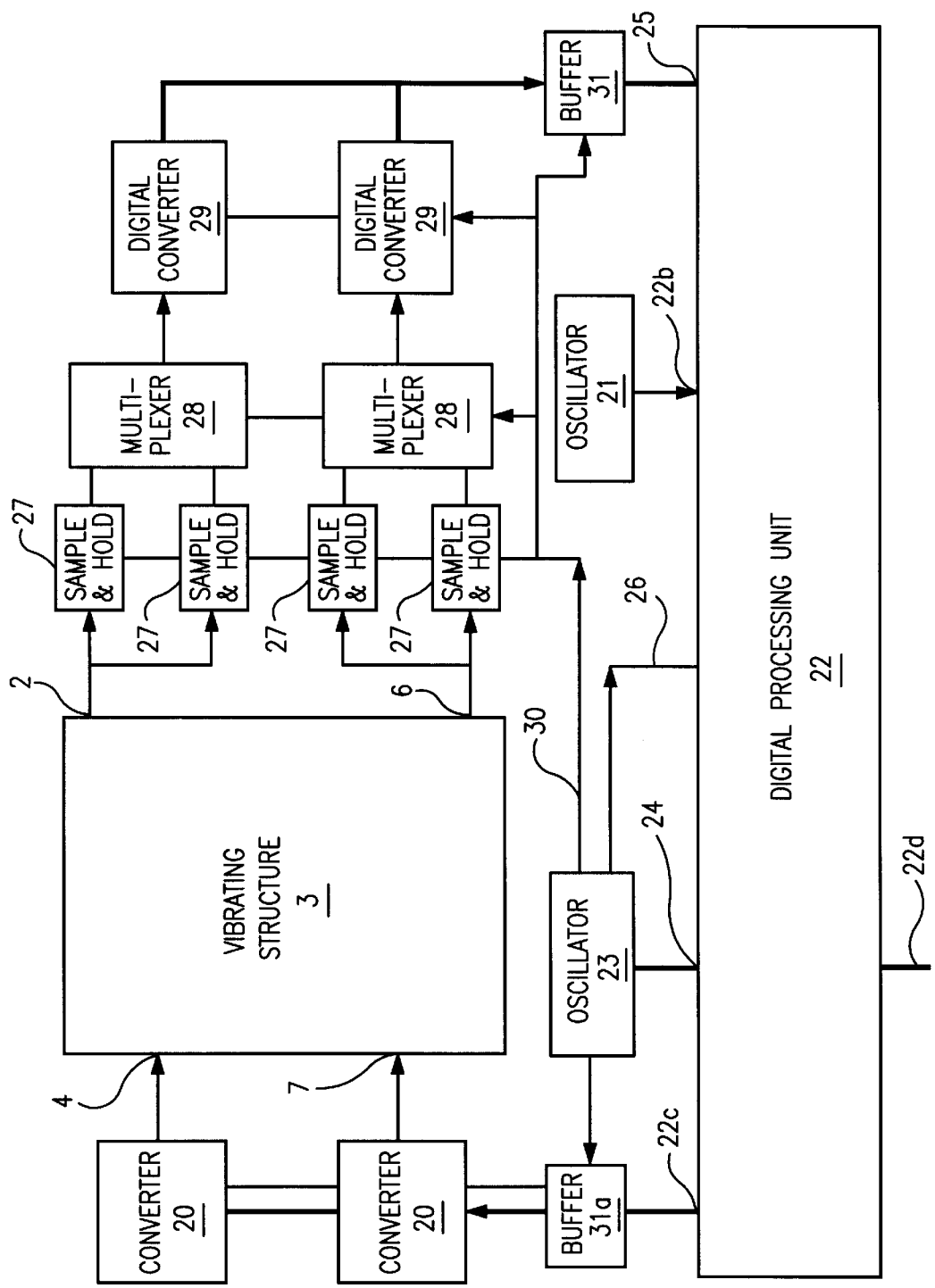
FIG. 4 is a detailed schematic diagram of a digital control system according to the present invention of FIG. 3.

FIG. 4 of the accompanying drawings shows in more detail an implementation of the block diagram of FIG. 3. In FIG. 4 the sample/convert or analogue to digital converters 19 are arranged to sample, or integrate the signal over each quarter cycle (80 kHz) of the input waveform received from the means 2 or 6. Two sample and hold devices 27 are required for each channel, i.e. each output channel from the means 2 and means 6 making a total of four devices 27. Two devices per channel enables interleaving of the samples to ensure no loss of information. A multiplexer 28 is included in each channel to receive the output from the associated two sample and hold devices 27 to select the appropriate quarter sample for conversion. Each channel therefore includes a single analogue to digital converter 29 to perform the conversion.

In the FIG. 4 embodiment the variable frequency oscillator provides an output signal at 20 kHz to the interrupt 26 and an output signal at 80 kHz at 30 to the bank of sample and hold devices 27. Data input at 25 to the unit 22 is at 20 kHz and is received through buffer 31 which stores the received quarter cycle (80 kHz) data prior to passage to the unit 22. Data is output from 22c at 20 kHz and is stored in buffer 31a whereupon the value for each quarter cycle is read and applied to the digital to analogue converters 20 under the control of the oscillator 23 (80 kHz).

Figure 5:
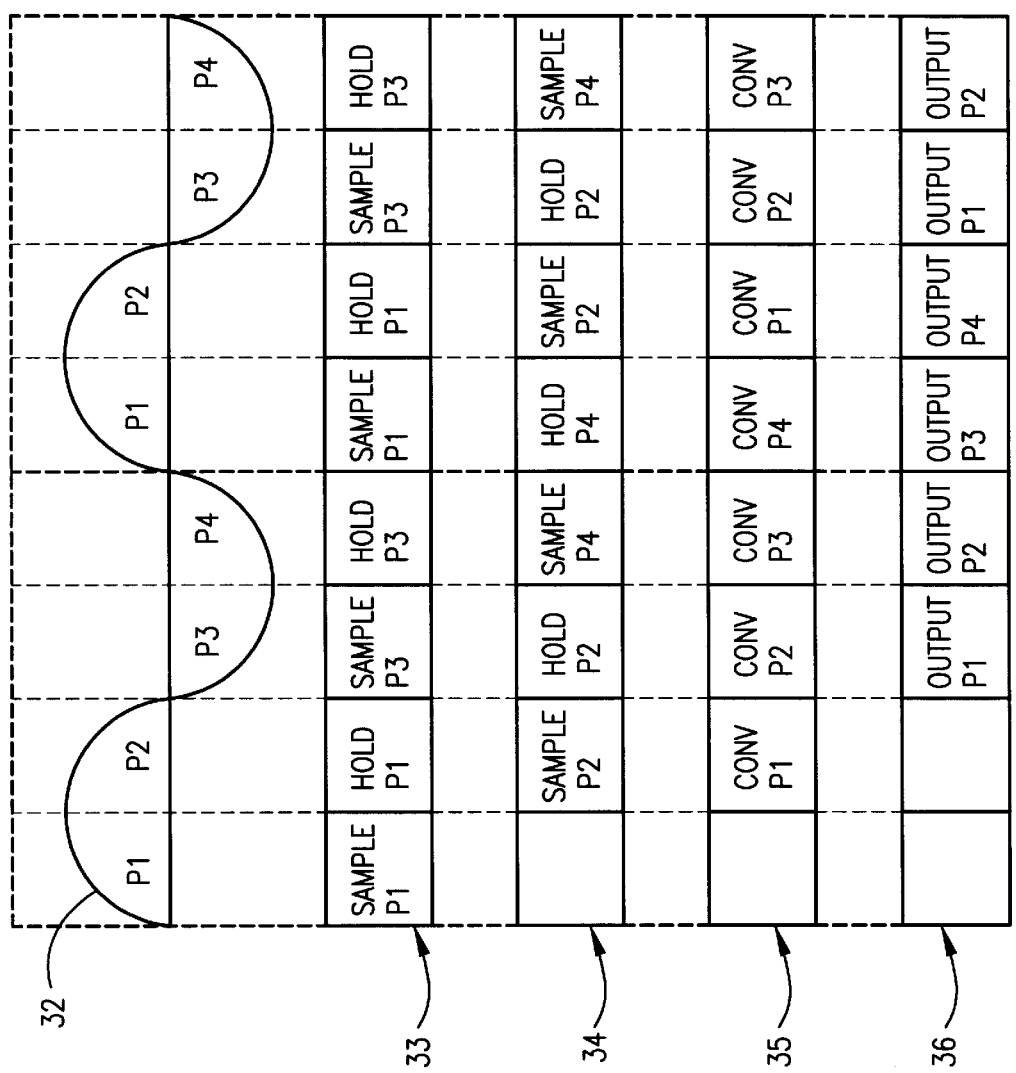
FIG. 5 is a diagram showing the sample and conversion sequencing for the system of FIGS. 3 and 4.

FIG. 5 of the accompanying drawings shows the sample and conversion sequence for the system illustrated in FIG. 4. Only single pickoff output signal from the primary pickoff means 2 is shown for simplicity although an identical sequence would be applied to the secondary pickoff means 6. The output signal from the secondary pickoff means 6 is illustrated as an input waveform at 32. In FIG. 5 a first of the two sample and hold devices 27 of the pair connected to the primary pickoff means 2 as shown at 33 samples the first quarter cycle of the input waveform 32 at P1 with the timing being controlled by the variable frequency oscillator 23. The second of the two sample and hold devices 27 connected to the primary pickoff means 2 will, as shown at 34 sample the second quarter cycle P2 of the input waveform 32 during which time the analogue to digital converter 29 connected via the multiplexer 28 to the first and second sample and hold devices connected to the primary pickoff means 2 will, as shown at 35 be converting the analogue voltage held on the first sample and hold device 27 namely P1.

The result of the conversion is made available to the digital processing unit 22 at the end of this period. During the third quarter cycle the first of the sample and hold devices 21 connected to the primary pickoff means 2 will again sample the input waveform 32 at P3 while the first of the analogue to digital converters 29 is converting the signal held on the second sample and hold device 27 connected to the primary pickoff means 2 namely P2.

Similarly during the fourth quarter cycle the second sample and hold device 27 will again sample the input waveform at P4 whilst the first analogue to digital converter 29 is converting the signal held on the first of the sample and hold devices at P3. The last sample P4 is converted during the fifth quarter cycle which forms the first cycle of the new period, while P1 is again being sampled by the first sample and hold device 27 at the beginning of a new sequence.

Data is available from the first analogue to digital converter 29 after each quarter cycle 80 kHz but is stored in the buffer (FIFO) 31 to enable the processing unit 22 to act on complete cycles of input waveform as shown at 36 in FIG. 5. Data can therefore be read by the unit 22 at a lower rate such as 20 kHz, 10 kHz, 5 kHz under control of an interrupt at 26 generated by the variable frequency oscillator 23.

A similar procedure is used for the primary and secondary drive means 4 and 7 whereby the drive waveform which is typically sinusoidal or square wave, is generated by one or other of the digital to analogue converters 20 synchronised to the output of the variable frequency oscillator 23. The amplitude of the applied drive waveform for each quarter cycle of the waveform is set by a digital word from the digital processing unit 22. By computing suitable values for each quarter cycle a drive waveform of any relative phase can be synthesised.

Figure 6:
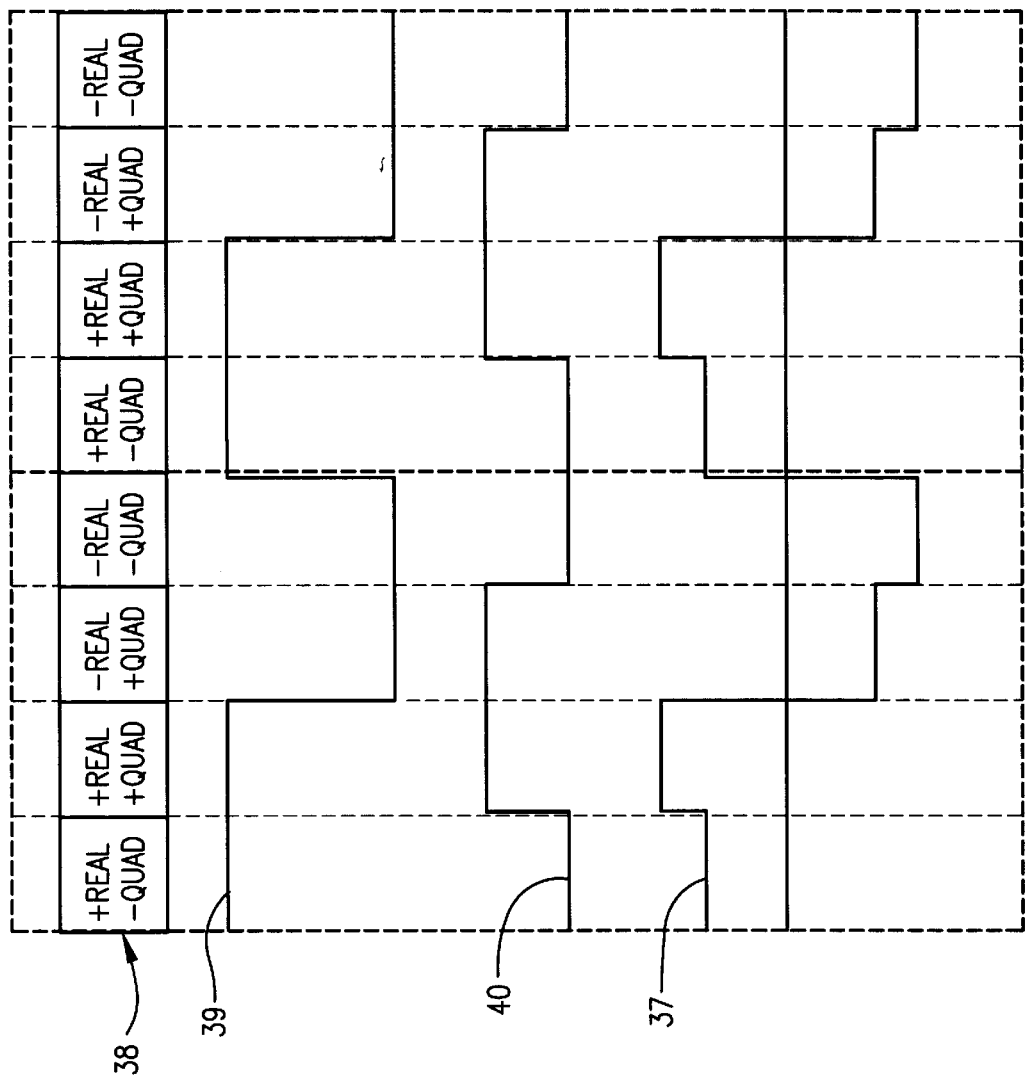
FIG. 6 is a diagram showing the data and conversion sequencing for the control system of the present invention as shown in FIGS. 3 and 4 for the drive loop.

FIG. 6 shows the data and conversion sequencing for the drive sequence for the system shown in the embodiment of FIG. 4. Only a single drive output signal for the primary drive means 4 is shown at 37 for simplicity although an identical sequence would be applied to the secondary drive means 7. Data for each quarter cycle is computed by the digital processing unit 22 during the previous interrupt and loaded into the buffer 31a, associated with the digital to analogue converters 20, as shown at 38 in FIG. 6. Each data value comprises the sum of a real or in-phase magnitude component 39 and a quadrature, or out of phase magnitude component 40. The real component value 39 is negated during the third and fourth quarter cycles such that an in-phase periodic waveform can be generated. Similarly the quadrature component value 40 is negated during the first and fourth quarter cycles such that an out of phase of lagging periodic waveform can be produced. The digital to analogue converter 20 output will therefore be the sum of these two possible waveforms enabling any phase and magnitude of signal to be produced for the primary drive means 4 or secondary drive means 7.

Figure 7:
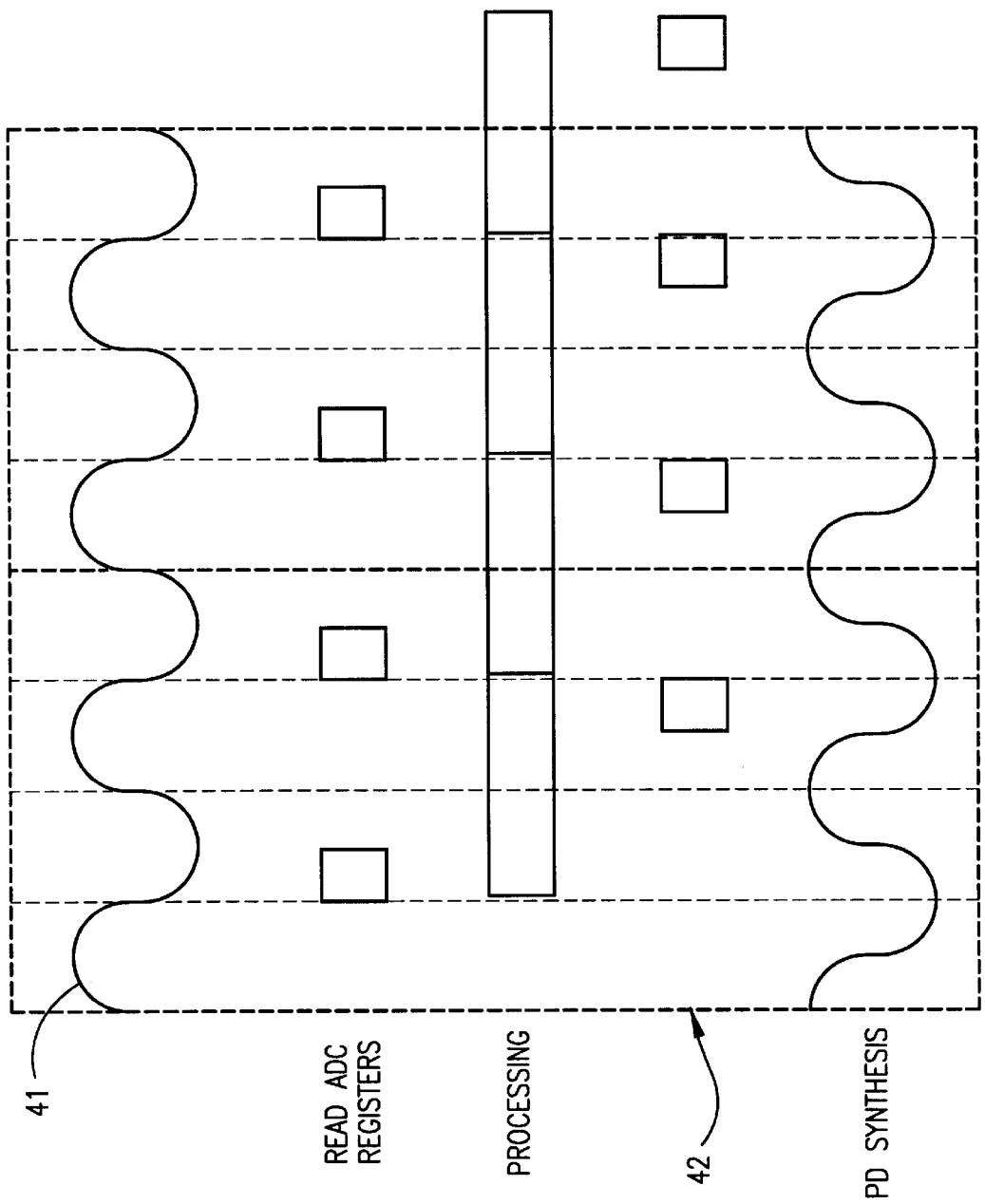
FIG. 7 shows diagramatically the overall sample/process, drive cycle for the control system of FIGS. 3 and 4 according to the present invention.

An overall sample/process/drive cycle is shown in FIG. 7 of the accompanying drawings. In FIG. 7 data for the first cycle of input waveforms 41 from the primary pickoff means 2 and secondary pickoff means 6 are sampled by the variable frequency oscillator 23 and are available for processing during the second cycle of the input waveform 41. Digital processing/filtering is carried out at an appropriate frame rate such as 20 kHz or lower, and the output or drive data for each quarter cycle is written to the digital to analogue converter registers at the end of each frame as shown at 42. The digital to analogue converter sequencing to generate the drive waveforms for the primary drive means 4 and secondary drive means 7 is controlled similarly by the variable frequency oscillator 23.

The frequency and relative phasing of the input signals from the primary pickoff means 2 and secondary pickoff means 6 and drive signals to the primary drive means 4 and secondary drive means 7 will therefore be accurately defined and controlled independently of the clock element of the processing unit 22. This permits the system to be fault tolerant by enabling processing frames to be missed or extended without significantly affecting the output from the system. The frame rate can be chosen or reduced to match and available processing power.

The variable frequency oscillator 23 requires to be adjusted to a fine resolution frequency to enable the frequency of the vibrating structure 3 to be accurately tracked. This may be achieved with a suitably wide control word or alternatively by averaging over time to give an enhanced resolution of frequency adjustment or reduced resolution of the parallel control word.

Figure 8:
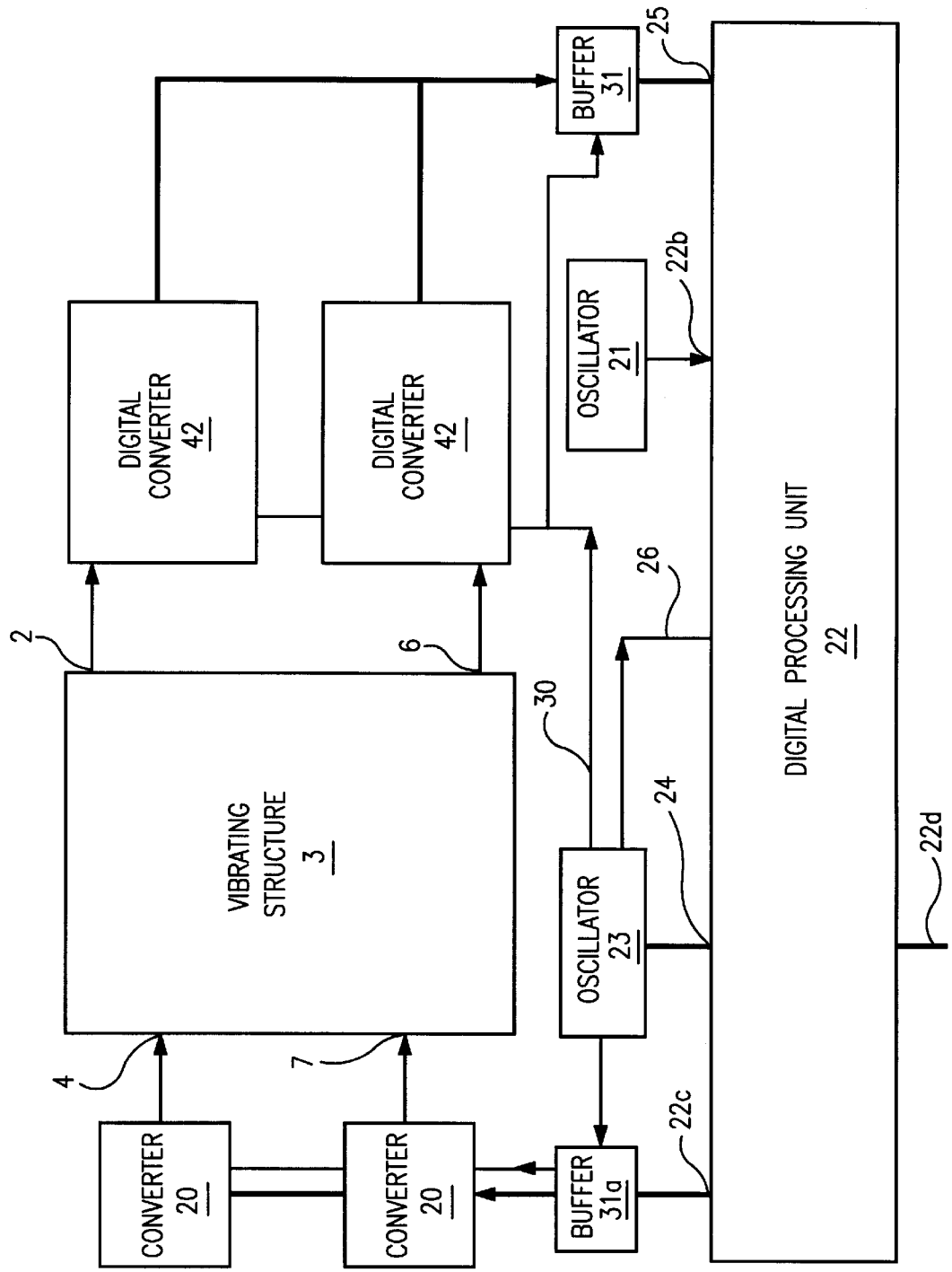
FIG. 8 is a block diagram of a digital control system according to a second embodiment of the present invention.

To provide a high degree of noise rejection it is preferable to use sample and hold devices which average or integrate the input waveform over the sample period. The example as shown in FIG. 8 of the accompanying drawings two sigma/delta analogue to digital converters 42 can be employed located one in the output line from the primary pickoff means 2 and one in the output line from the secondary pickoff means 6. Such utilisation removes the need for a sample and hold device and enables the integration period which is set by the variable frequency oscillator 23 to be controlled digitally simply by reading and resetting the summer within the converters 42. The processing rate is selected to optimise the required dynamic performance of the gyroscope fitted with the system of the invention, within the available processing power from the unit 22.

What is claimed is:

1. A digital control system for a vibrating structure gyroscope having a vibrating structure, a primary drive for putting and maintaining the vibrating structure in vibratory resonance and a primary pick off for detecting vibration of the vibrating structure and providing detection output signals, which system includes:
   a digital processing unit for receiving said output signals from the primary pick off, for processing and passing the received signals to the primary drive via digital to analogue converters,
   a sampler for sampling at selected intervals of time said output signals before passage to the digital processing unit; and
   a variable frequency oscillator connected to and under the control of the digital processing unit for controlling the sampling intervals of said sampler.

2. A digital control system according to claim 1, including a secondary drive for putting and maintaining the vibrating structure in vibratory resonance and a secondary pick-off for detecting vibration of the vibrating structure and providing detection output signals.

3. A digital control system according to claim 1, wherein the digital processing unit is operable to adjust the frequency of the variable frequency oscillator to a frequency which is a multiple of the resonant frequency of the vibrating structure based upon the output signals received by the digital processing unit from the primary pick off.

4. A digital control system according to claim 2, wherein the variable frequency oscillator is operable to generate a processor interrupt signal for synchronising loop filtering and control within the digital processing unit with the output signals received from one or more analogue to digital converters connected to receive the output signals from the primary and secondary pickoffs, which one or more analogue to digital converters form part of the sampler for sampling at selected intervals of time said output signals before passing to the digital processing unit.

5. A digital control system according to claim 4, including two analogue to digital converters, wherein the variable frequency oscillator is arranged to operate at substantially four times the natural resonant frequency of the vibrating structure to ensure sampling of the primary and secondary pickoff output signals over each quarter cycle of the output signals to the analogue to digital converters from the primary and second pickoffs.

6. A digital control system according to claim 4, wherein the sampler includes two or more sample and hold devices for each output signal channel from the primary and secondary pickoffs to provide interleaving of the samples.

7. A digital control system according to claim 6, including a data buffer for receiving data from the analogue to digital converter or converters after each quarter cycle and storing the data to enable the digital processing unit to receive data from the buffer over complete cycles of the primary and secondary pickoff output signals.

8. A digital control system according to claim 2, wherein the digital to analogue converters generate a drive waveform for passage to the primary and secondary drives to excite the vibrating structure into vibratory resonance, which digital to analogue converters are synchronised to the variable frequency oscillator.

9. A digital control system according to claim 2, wherein the sampler samples at selected intervals of time said output signals before passage to the data processing unit, includes two or more sigma delta analogue to digital converters arranged to receive the output signals from the primary and secondary pickoffs to integrate a waveform of the output signals over the sample intervals.

10. A vibrating structure gyroscope having a digital control system according claim 1.

* * * * *